United States Patent [19]

Isaji et al.

[11] Patent Number: 5,707,080
[45] Date of Patent: Jan. 13, 1998

[54] SEAT BELT FASTENING DEVICE

[75] Inventors: Kazuyoshi Isaji, Kariya; Mutsumasa Koujiya, Toyota; Yutaka Ohashi, Handa; Kyojiro Suzuki; Shingo Wanami, both of Kariya, all of Japan

[73] Assignee: Nippondenso Co., Ltd., Kariya, Japan

[21] Appl. No.: 555,175

[22] Filed: Nov. 8, 1995

[30] Foreign Application Priority Data

Dec. 12, 1994 [JP] Japan ............... 6-332488

[51] Int. Cl.⁶ ............................................ B60R 22/46
[52] U.S. Cl. ................. 280/806; 280/801.1; 297/480
[58] Field of Search ........................ 280/801.1, 806; 297/468, 480

[56] References Cited

U.S. PATENT DOCUMENTS

| | | |
|---|---|---|
| 4,948,171 | 8/1990 | Knabel et al. |
| 4,999,004 | 3/1991 | Skanberg et al. |
| 5,290,062 | 3/1994 | Fohl ................... 280/801.1 |
| 5,328,118 | 7/1994 | Tokugawa et al. .......... 280/806 |

FOREIGN PATENT DOCUMENTS 5-170050   7/1993   Japan.

Primary Examiner—Eric D. Culbreth
Attorney, Agent, or Firm—Cushman, Darby & Cushman Ip Group of Pillsbury Madison & Sutro LLP

[57] ABSTRACT

A seat belt fastening device has a seat belt buckle and a single casing in which a compression coil spring for pulling in slack of the seat belt is positioned between a retainer and a flange of a guide member. An inertial mass member is slidably disposed in the guide member. The coil spring is connected by a wire to a pulley unit through the retainer and guide member. The seat belt buckle is connected to the pulley unit by a wire. The wire is usually wound to the pulley unit which is locked by a control lever. When the inertial mass member moves under excessive deceleration, it drives operation levers and the control lever to unlock the pulley unit. As a result, the wire is pulled out from the pulley unit by the released compression spring. Incidentally, the wire is wound to the pulley unit so that the buckle is retracted into the casing and the slack of the seat belt is reduced.

17 Claims, 4 Drawing Sheets

SEAT BELT FASTENING DEVICE

BACKGROUND OF THE INVENTION

1. Field of the Invention

The present invention relates to a seat belt fastening device for a vehicle which retracts the seat belt to eliminate slack before locking when excessive deceleration is applied to a vehicle.

2. Description of Related Art

Such devices are disclosed in Japanese Unexamined Patent Publications Hei 1-244944, Hei 2-256550 and Hei 5-170050. However, the above conventional devices have triggering mechanisms outside casings which necessitate more space to install the device.

SUMMARY OF THE INVENTION

The present invention is made in view of the above problems, and a primary object of the present invention is to provide a compact and simple seat belt fastening device.

Another object of the present invention is to provide a seat belt fastening device in which a spring guide member is disposed in a main spring and a triggering mechanism is housed in a compact casing of the device.

Another object of the present invention is to provide a seat belt fastening device which includes a casing secured to a vehicle body and the following members housed in the casing. Such members includes a guide member, an inertial mass member disposed slidably in the guide member to move from a setting position to a triggering position when sensing excessive deceleration, a coil spring disposed around the guide member to pull the seat belt buckle, a connecting member connecting the coil spring with the seat belt buckle, a holding member for holding the connecting member so that the coil spring stores sufficient pulling force, and triggering means for releasing the connecting member when the inertial mass member moves.

Another object of the present invention is to provide a seat belt fastening device wherein the guide member has a key for retaining the inertial mass member unmovable when the fastening device is not in use.

A further object of the present invention is to provide a seat belt fastening device, wherein the connecting member has a first wire connecting the inertial mass member and the holder member and a second wire for connecting the holding member and said seat belt buckle, the holding member has a first pulley for winding the first wire when the inertial member is in the setting position and second pulley for winding the second wire when said inertial member moves to the triggering position, and the triggering means includes a control lever in engagement in the holding member for permitting rotation of the holding member when the inertial member moves to the triggering position.

According to the present invention, since the triggering mechanism is disposed inside the casing and the inertial mass member is housed inside the coil spring, a compact fastening device can be provided.

BRIEF DESCRIPTION OF THE DRAWINGS

Other objects, features and characteristics of the present invention as well as the functions of related parts of the present invention will become clear from a study of the following detailed description, the) appended claims and the drawings. In the drawings:

DETAILED DESCRIPTION OF THE PREFERRED EMBODIMENT

Preferred embodiments will be described with reference to appended drawings hereafter.

Figure 2:
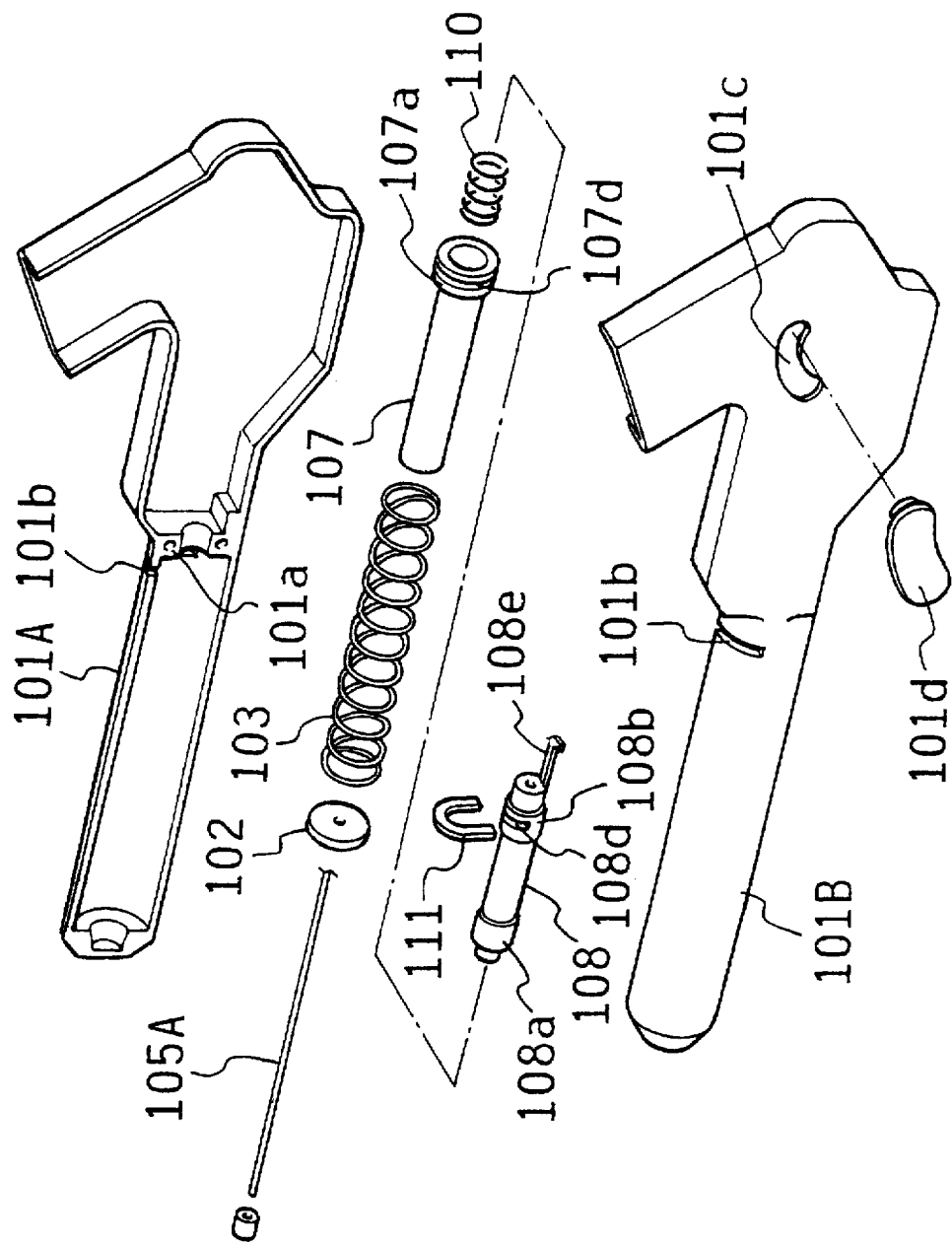
FIG. 2 is an exploded perspective view illustrating a portion of the seat belt fastening device.

A casing 101 is composed of a pair of symmetrical casing members 101A and 101B as shown in FIG. 2. A front half portion of the casing 101 has a cylindrical portion extending toward the front of a vehicle. The rear half portion of the casing 101 has a v-shaped bend portion having an open end as shown in FIG. 2.

The cylindrical portion of the casing 101 has a closed end and a coil spring 103 is disposed inside the cylinder portion in the compressive state. A cylindrical guide member 107 has a flange member 107a at the rear end thereof and is disposed inside the coil spring 103 so that the rear flange member 107a abuts a partition 101a located between the front portion and the rear portion of the casing 101. The guide member 107 is made of low frictional resinous material and has a stop member 107c at the front end thereof. The stop member 107c has a hole 107b through which a wire 105A extends rearward. The rear end of the coil spring 103 is secured to the rear flange member 107a. A retainer plate 102 is disposed in front of the guide member 107 and retained by the wire 105A extending through a hole 107b thereof to hold the coil spring 103 in the compressive state.

A cylindrical inertial mass member 108 is disposed in the guide member 107 to move along the inner surface of the guide member 107 from a setting position to a triggering position as described later. The inertial mass member 108 has sliding surfaces 108a and 108b which are larger in diameter than other portions and formed at opposite ends thereof. Since only the sliding surfaces are in contact with the inner surface of the guide member 107, friction loss can be minimized and precise machining is necessary only at limited portions. A weak sensor spring 110 is disposed between the inertial mass member 108 and the stop member 107c of the guide member 107 to bias the inertial mass member 108 rearward so that the rear sliding surface 108b is positioned in abutment with the partition 101a when deceleration is lower than a designated value (setting position) and moves forward to abut the stop member (triggering position) when the deceleration is greater than the designated value. The rear end of the inertial mass 108 is located in an opening of the partition 101a and the front end of the inertial mass has a relatively large center hole 107b. The wire 105A extends from the retainer plate 102 through the hole 107b of the guide member and the center hole 108b of the inertial mass member 108 to the rear half portion of the casing 101.

A circumferential groove 101b is formed on an upper periphery of the cylindrical portion of the casing 101 along the rear flange 107a of the guide member 107, and a U-shaped removable key 111 shown in FIG. 2 is inserted therein so that an inner edge of the key 111 engages a lateral groove 108d formed on the sliding surface 108b of the inertial mass member 108 through a lateral groove 107d formed on the rear flange 107a of the guide member as shown in FIG. 2. Thus, the inertial mass member 108 is retained in the guide member 107.

Figure 3:
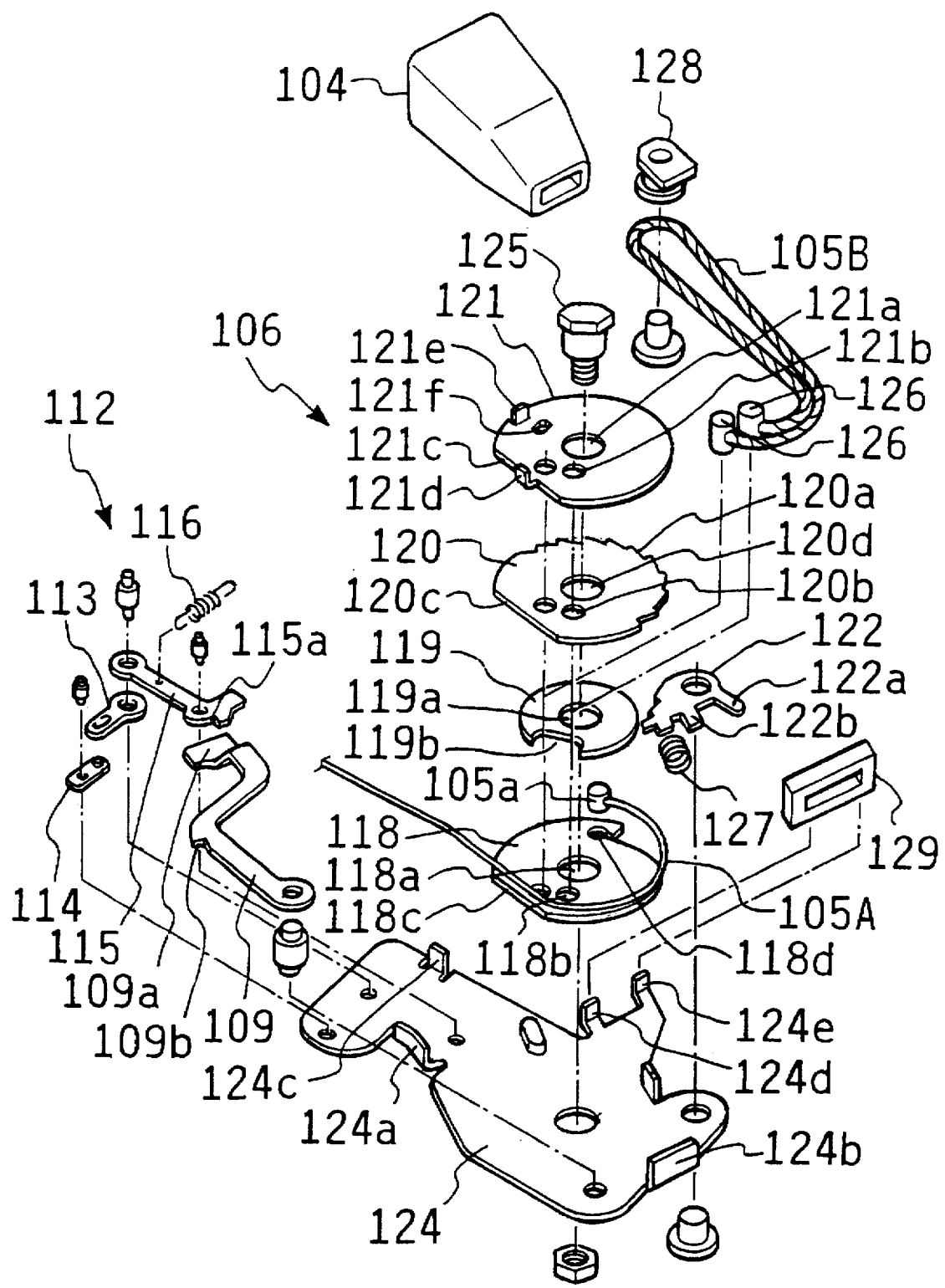
FIG. 3 is an exploded perspective view illustrating a portion of the seat belt fastening device.

A base plate 124 is shaped to conform to the inner periphery of the rear half portion of the casing 101 and disposed therein to support rotatably a base pulley 118, a guide pulley 119, a one way pulley 120, and a holding pulley 121 with a bolt 125 as shown in FIG. 3. The guide pulley 119 has an arc-shaped cutout 119b in engagement with a pair of pins 126 which hold opposite ends of a wire 105B, and are inserted into pairs of openings 118b, 120b and 121b formed respectively in the base pulley 118, the one way pulley 120 and the holding pulley 121. Thus, all the pulleys 118, 119, 120 and 121 rotate together and compose a pulley unit 106. The pulleys 118, 120, and 121 have similar flat cut portions 118c, 120c and 121c respectively.

Figure 1:
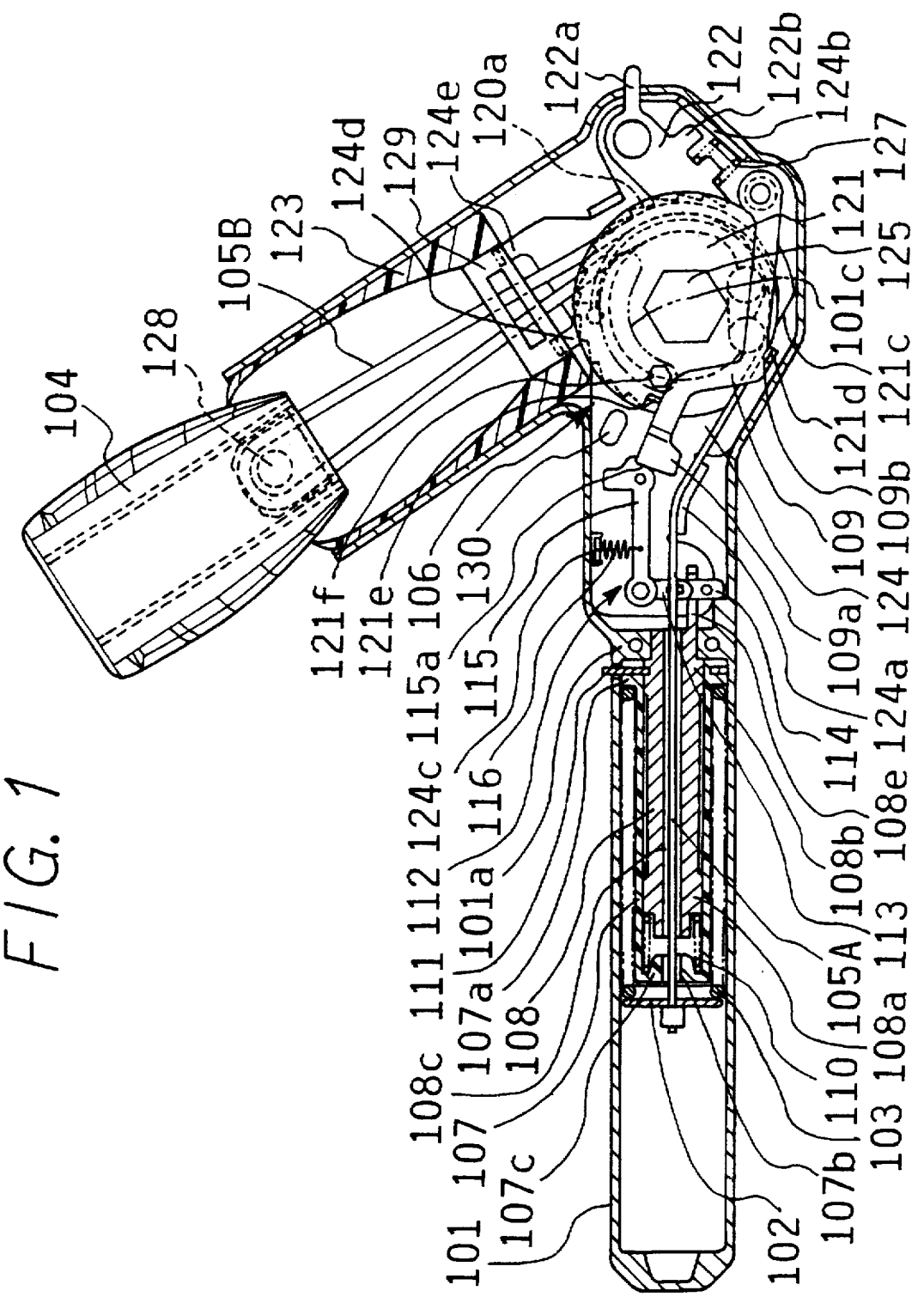
FIG. 1 is a cross-sectional side view illustrating a seat belt fastening device.

The base pulley 118 has an inlet 118d having a circular opening which holds a pin 105a secured to an end of the wire 105A extending from the retainer plate 102 through a guide 124a of the base plate 124. The one way pulley 120 has a plurality of saw teeth 120a formed on a half portion of its periphery. Each of the saw teeth 120a has a sharp edge side at one side (left in FIG. 3) and a gentle slope side at the other side (right in FIG. 3). A pawl 122 is rotatably secured to the base plate 124 and biased to engage the teeth 120a of the one way pulley 120 by a spring 127 which is disposed between the base plate 124 and a retaining plate 124b. Thus, the one way pulley 120 and the pawl composes a ratchet wheel which is prevented from rotating counter-clockwise in FIG. 1 or FIG. 3 when the pawl 122 engages one of the sharp edges of the teeth 120a of the one way pulley 120. The pawl 122 has a handle member 122a which extends from the casing 101 as shown in FIG. 1 so that a driver can turn it counter-clockwise to disengage the pawl 122 from the teeth 120a. A projection 122b is formed on the pawl 122 to extend toward the retaining plate 124b. The holding pulley 121 has an upstanding stop member 121d, a resetting projection 121e and a hexagonal opening 121f for accommodating a wrench introduced from an arc-shaped opening 101c formed on the casing 101 as shown in FIG. 2 when the fastening device is set or reset-for the next use. The stop member 121d is located outer circumference of the wire wound around the base pulley 118. The arc-shaped opening 101c is closed by an arc-shaped cap 101d except when the wrench is inserted therein.

A control lever 109 is supported rotatably by the base plate 124 in the longitudinal direction of the casing 101 and located on the pulley 121 closely. The control lever 109 has an L-shaped cutout 109b at a central portion, which the stop member 121d of the holding pulley 121 engages to restrict clockwise rotation of the holding pulley 121. The control lever 109 bends obliquely upwards from the central portion and downward to the base plate 124 to cross over the holding pulley 121. The control lever 109 has a head 109a which engages a cutout portion 115a formed on a rear portion of a link lever 115. The link lever 115 is secured rotatably to the base plate and extends horizontally in the longitudinal direction of the casing 101. A pair of upper and lower link levers 113 and 114 which function as a toggle motion member is secured rotatably to the base plate. A front end of the link lever 115 is connected rotatably to the upper link lever 113. The link lever 115 is biased by a spring 116 disposed between a central portion of the lever 115 and a retaining plate 124c of the base plate 124 to lay generally horizontally, thereby aligning the paired link levers 113 and 114 as shown in FIG. 1. The paired link levers 113 and 114 and the link lever 115 with the spring 116 compose an operation lever 112 which drives the control lever 109 to control the rotation of the holding pulley 121. A hook member 108e extends from a rear portion of the inertial mass member 108 to the back of the lower link member 114 so that the hook member 108e engages the lower link member 114 to bend the paired link levers 113 and 114 into a V-shape (toggle motion), and raises the cutout portion 115a of the link lever 115 to disengage from the head portion 109a of the control lever when the inertial mass member 108 moves forward, thereby disengaging the control lever 109 from the stop member 121d with slight operational force.

A seat belt buckle 104 is located at an upper open end of the rear half portion of the casing 101 with one end of the buckle 104 inserted into the open end as shown in FIG. 1. The buckle has a nut 128 at the one end. The wire 105B turns about the nut 128 and extends along the periphery of the guide pulley to the arc-shaped cutout 119b shown in FIG. 3. A cover 123 made of foamed resinous material is stuck on the inner wall of the casing 101 around the upper open end thereof, and has a lip in contact with the outer periphery of the buckle to keep off dust or foreign particles. The inner periphery of the cover 123 conforms to the outer configuration of the buckle 104 to guide the buckle 104 when retracted. A buffer member 129 is fixed on a pair of projections 124d and 124e formed on the base plate 124 to ease shocks caused when the buckle 104 is retracted.

When the fastening device is put to use, the key 111 is removed to free the inertial mass member 108. The retainer plate 102 which is biased by the compressed coil spring 103 exerts strong clockwise torque (in FIG. 1) on the base pulley 118 (and other pulleys 119 through 121) through the wire 105A.

Figure 4:
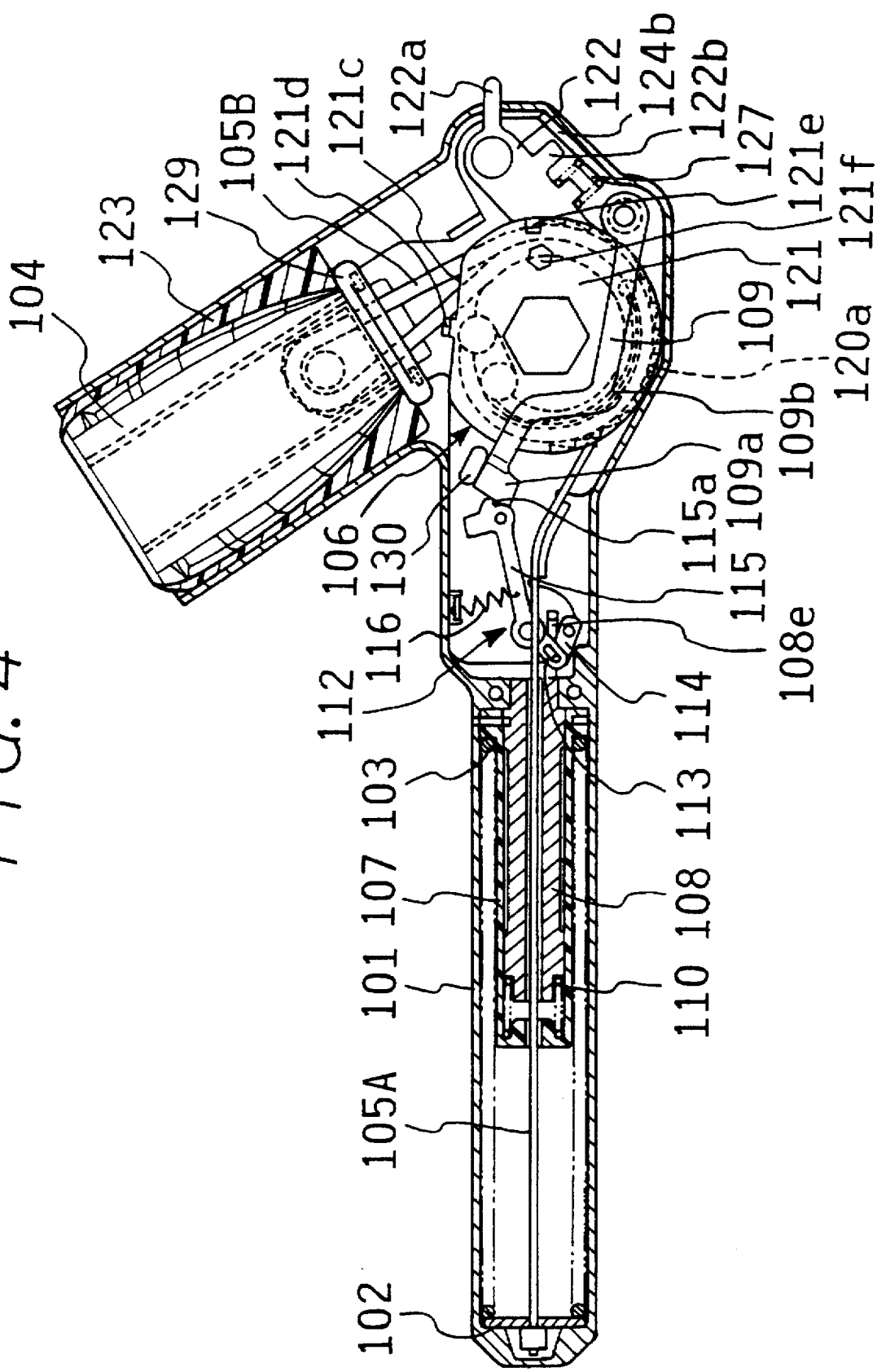
FIG. 4 is a cross-sectional side view illustrating the seat belt fastening device in operation.

When an excessive deceleration is generated while a vehicle is running, the inertial mass member 108 moves forward and compresses the sensor spring 110 until it abuts the stopper 107c of the guide member. Incidentally, the hook member 108e of the inertial mass member 108 pulls a rear side of the lower link lever 114 and bends the aligned levers 113 and 114 into a V-shape as shown in FIG. 4. As a result, the link lever 115 is triggered to turn downward, and the cutout portion 115a of the link lever 115 disengages from the head 109a of the control lever 109.( When the deceleration disappears, the inertial mass member 108 returns to the original position as shown FIG. 4.) As a result, the stop member 121d of the holding pulley 121 is disengaged from the L-shaped cutout 109b of the control lever 109, and the control lever is driven by the compressed spring 103 through the stop member 121d and rotates clockwise until it abuts a stopper member 130 projecting from the base plate 124. The rear portion of the link lever 115 remains in contact with a side of the head 109a of the control lever 109. When the control lever 109 rotates clockwise, it separates from the stop member 121d and the holding pulley 121 and other pulley members 118 through 120 are allowed to rotate clockwise driven by the compressive spring 103, so that the wire 105A is pulled by the retainer plate 102 which is driven forward by the coil spring 103 quickly. The pawl 122 steps over the gentle slope of the teeth 120a of the one way pulley 120. However, since the retaining plate 124b restricts movement of the projection 122b, the pawl 122 is prevented from hopping abnormally over the teeth 120a. When the wire 105A is pulled out, the wire 105B connected to the buckle 104 is wound to the guide pulley 119, and the buckle 104 is retracted into the cover 123 in the casing 101. As a result, a seat belt (not shown) which is connected to the buckle 104 is retracted. The holding pulley 121 rotates clockwise until the stop member 121d is positioned at the upper most portion since the all the pulley members 118 through 121 have cutout portions 118b, 119b, 120c and 121c. If pulling force is applied to the buckle 104 caused when a driver moves forward, the pawl 122 engages the steep edge teeth of the one way pulley 120 and restricts reversal of the guide pulley 119.

When the fastening device is going to be reset, a wrench having a hexagonal head is introduced from the arc-shaped opening 101c of the casing 101 and fitted into the hexagonal opening 121f of the holding pulley. Then, the handle member 122a is operated to separate the pawl 122 from the one way pulley 120, and thereafter the holding pulley 121 and the other pulley members 118 through 120 are rotated counter-clockwise by the wrench. Thus, the wire 105A which has been pulled out is wound to the base pulley 118 again, and the retainer plate 102 retreats to compress the coil spring again. On the other hand, the wire 105B is pulled out of the guide pulley 119 and the buckle 104 is returned to the original position. When the holding pulley 121 is returned, the resetting projection 121e abuts an upper side portion of the control lever 109 to move downward, so that the head 109a separates from the stopper member 130 and engages the link lever 115. The link lever 115 is returned to the horizontal position by the spring 116, and the link levers 113 and 114 are returned to the aligned (straight position. The stop member 121d of the holding pulley 121 engages the L-shaped cutout 109b of the control lever 109 again. Thus the fastening device is ready for the next use.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A seat belt fastening device for a vehicle comprising:
   a seat belt buckle for receiving a seat belt;
   a casing secured to a vehicle body;
   a guide member disposed in said casing;
   an inertial mass member disposed in said guide member to move from setting position to triggering position when a designated deceleration is applied to said vehicle;
   a main spring, disposed around said guide member, for storing spring back force;
   a connecting member, having a retainer engaged with said main spring, for connecting said main spring with said seat belt buckle;
   a holding member disposed in said casing for holding said connecting member and said main spring so that said main spring stores a prescribed spring back force when setting; and
   means, disposed in said casing and connected between said inertial mass member and said holding member, for triggering said holding member to release said stored spring back force so that said connecting member pulls in said seat belt buckle when said inertial mass member moves to said triggering position, thereby pulling in slack of a seat belt coupled to said seat belt buckle.

2. A seat belt fastening device as claimed in claim 1, wherein said guide member comprises a stopper on an end thereof and a deceleration sensing spring disposed between said stopper and said inertial mass member.

3. A seat belt fastening device as claimed in claim 1, wherein said guide member comprises a key, in engagement with said inertial mass member, for retaining said inertial mass member unmovable when said fastening device is not in use.

4. A seat belt fastening device as claimed in claim 1, wherein
   said connecting member comprises a first wire connecting said inertial mass member and said holding member and a second wire for connecting said holding member and said seat belt buckle,
   said holding member comprises a first pulley for winding said first wire when said inertial mass member is in said setting position and second pulley for winding said second wire when said inertial mass member is in said triggering position, and
   said releasing means comprises a control lever in engagement with said holding member for permitting rotation of said first and second pulleys when said inertial member moves from said setting position to said triggering position.

5. A seat belt fastening device as claimed in claim 4, wherein said second wire is disposed in parallel with a plane of winding rotation of said second pulley.

6. A seat belt fastening device as claimed in claim 4, wherein said holding member comprises a stop member disposed at an outer periphery of said wound first wire in engagement with said control lever when said inertial mass member is in said setting position.

7. A seat belt fastening device as claimed in claim 6, wherein said releasing means comprises
   means connected to said inertial mass member for driving said control lever to disengage from said stop member when said inertial mass member moves to said triggering position.

8. A seat belt fastening device claimed in claim 7, wherein said driving means comprises:
   a link lever in engagement with said control lever for disengaging said control lever from said stop member when driven;
   a toggle motion member connected between said link lever and said inertial mass member for driving said link lever by toggle motion when said inertial mass member moves to said triggering position;
   and a spring for supporting said link lever in position.

9. A seat belt fastening device as claimed in claim 8, wherein said holding member comprises a resetting projection for resetting said control lever when said holding member is reset after being triggered.

10. A seat belt fastening device as claimed in claim 9, wherein said pawl comprises a handle member for manually disengaging said pawl from said one way pulley.

11. A seat belt fastening device as claimed in claim 8, wherein said holding member comprises a one way pulley and a pawl in engagement with said one way pulley for preventing reversal of said holding member after being triggered.

12. A seat belt fastening device as claimed in claim 1, wherein said casing comprises a cover member for accommodating said seat belt buckle when said seat belt buckle is pulled in by said connecting member.

13. A seat belt fastening device for a vehicle comprising:
    a seat belt buckle;
    a casing secured to a vehicle body;
    a guide member, having a slide inner surface and a flange, disposed in said casing;
    a inertial mass member disposed in said slide inner surface to move from a setting position to a triggering position when designated deceleration is applied to said vehicle body;

a compression coil spring, disposed in said casing around said guide member, for storing repulsion force in one direction;

a connecting member disposed in said casing for connecting said compression coil spring with said seat belt buckle through said guide member;

a holding member disposed in said casing between said compression spring and said seat belt buckle for holding said connecting member so that said main spring stores a prescribed repulsion force when said inertial mass member is in said setting position; and means disposed between said inertial mass member and said holding member for releasing said repulsion force to pull in said seat belt buckle.

14. A seat belt fastening device as claimed in claim 13, wherein said guide member comprises a stopper on an end thereof and a deceleration sensing spring disposed between said stopper and said inertial mass member.

15. A seat belt fastening device as claimed in claim 14, wherein said connecting member comprises a first wire for connecting said compression spring and said holding member and a second wire for connecting said holding member and said seat belt buckle, said holding member comprises a first pulley for winding said first wire when said inertial mass member is in said setting position and second pulley for winding said second wire when said inertial mass member moves to said triggering position, and said releasing means comprises a control lever in engagement with said holding member for permitting rotation of said first and second pulleys when said inertial member moves to said triggering position.

16. A seat belt fastening device as claimed in claim 15, wherein said releasing means comprises:

means connected to said inertial mass member for driving said control lever to disengage from said holding member when said inertial mass member moves to said triggering position.

17. A seat belt fastening device as claimed in claim 16, wherein said driving means comprises:

a pair of members engaged with said inertial mass member for changing from a straight state to a bent state when said inertial mass member moves to said triggering position; and a link lever connected between said paired members and said control lever for disengage said control lever from said holding member when said paired members changes to said bent state.

* * * * *